Oct. 27, 1964    K. O. L. WALLMAN ETAL    3,154,121
BARK REMOVING ATTACHMENT
Filed March 7, 1961      3 Sheets-Sheet 1
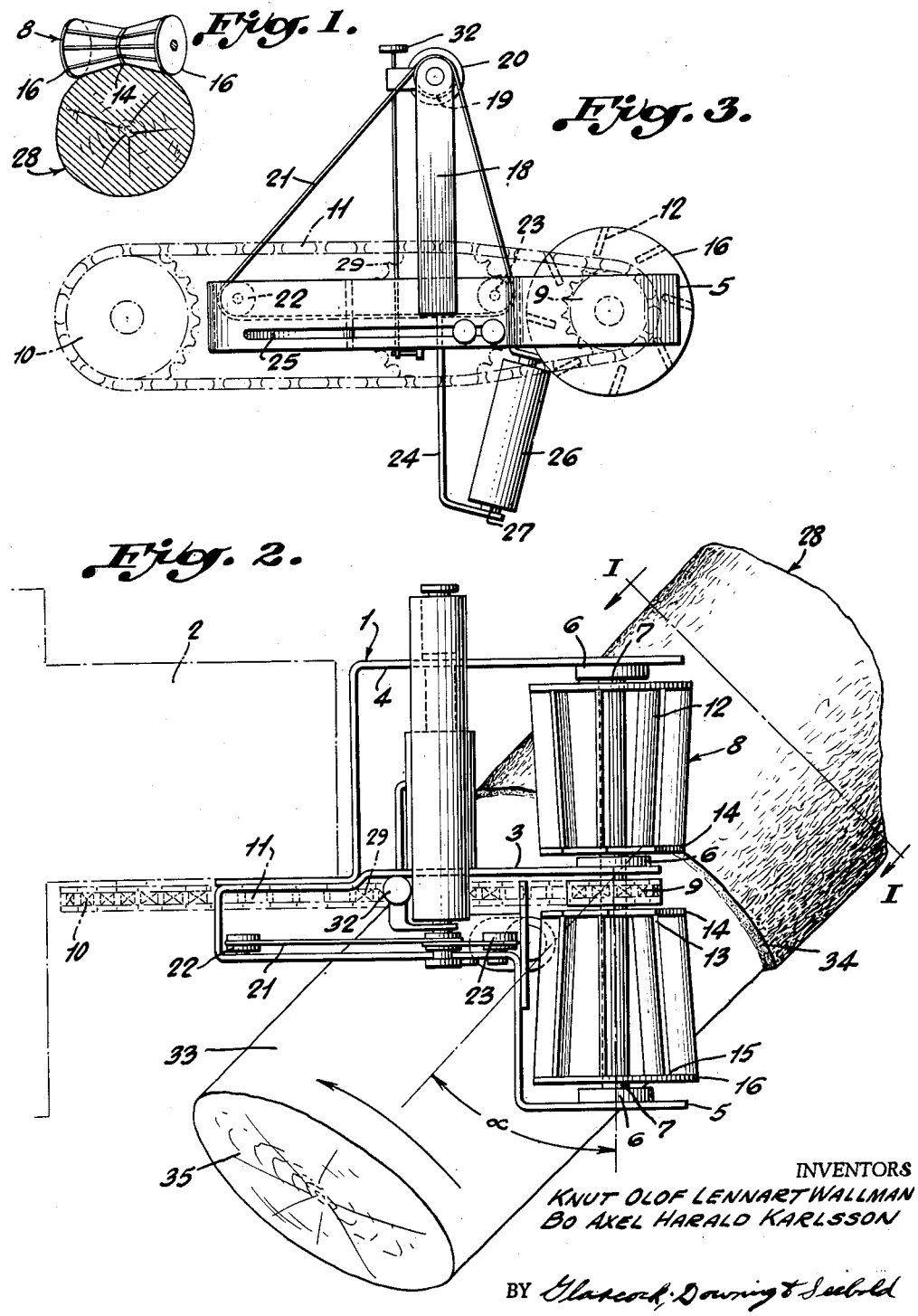
INVENTORS
KNUT OLOF LENNART WALLMAN
BO AXEL HARALD KARLSSON
BY *Glascock, Downing & Seebold*
ATTORNEYS

INVENTORS
KNUT OLOF LENNART WALLMAN
BO AXEL HARALD KARLSSON

ATTORNEYS

INVENTORS
KNUT OLOF LENNART WALLMAN
BO AXEL HARALD KARLSSON

BY
ATTORNEYS

United States Patent Office 3,154,121
Patented Oct. 27, 1964

3,154,121
BARK REMOVING ATTACHMENT
Knut Olof Lennart Wallman and Bo Axel Harald Karlsson, both of Oskarsgatan 10, Linkoping, Sweden
Filed Mar. 7, 1961, Ser. No. 93,988
8 Claims. (Cl. 144—208)

The present invention relates to an engine driven bark removing attachment, preferably for portable chain saws, comprising a rotary clutter having axially extending blades the radius of cut of which increase in the direction towards the ends of the cutter, and which cutter is adapted to remove bark from logs or similar round work-pieces with the axis of rotation of the cutter extending crosswise above the workpiece.

In known bark removing attachments of the above character the attachments are arranged either wholly free or unguided in relation to the workpiece, so that the workman must try to move the cutter into proper position without auxiliary means, or forcibly guided in such a way that the axis of rotation of the cutter forms a predetermined angle, usually 90°, relative to the longitudinal axis of the workpiece.

These two kinds of attachments have the deficiency that the depth of cut cannot be controlled during the procedure of the work, and in view of the great variations in shape, thickness of bark etc. of such a workpiece it is therefore difficult to obtain a satisfactory result. In addition these known attachments have no means to prevent damages to the wood inside the bark as a result of the tearing action of the ends of the blades. For these reasons the attachments have not proved a satisfactory substitute for the previous method of removing the bark manually, which method is tiring and time consuming and not economical.

The present invention has for an object to remove these known deficiencies, and this is achieved in that at the ends of the cutter there are arranged supports having a periphery which is spaced apart from the axis of rotation of the cutter a distance substantially equal to the largest radius of cut, so that the supports may prevent the workpiece from being damaged by the blades at the ends of the cutter and that the periphery of the supports is formed with slide surfaces which in cooperation with the arcuate surface of the workpiece and dependant on the angle at which the axis of rotation crosses the workpiece are arranged to determine the perpendicular setting of the cutter during operation and thereby the size of the depth of cut.

The accompanying drawings illustrates complete examples of the physical embodiments of the invention constructed according to the best modes so far devised for the practical application of the principles thereof, and in which:

FIG. 1 is a view, showing the cutter of the bark removing attachment in working position and a log cut along a line I—I in FIG. 2.

FIG. 2 is a top view of the attachment and a part of the log.

FIG. 3 is a side view of the attachment.

Figure 4:
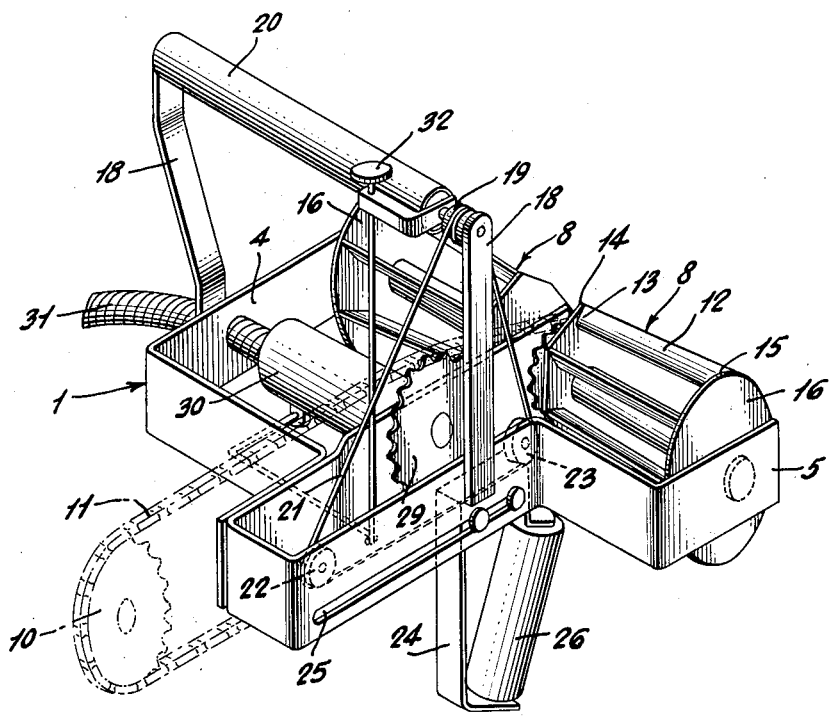
FIG. 4 is a perspective view of the attachment.

The attachment is mounted in a frame 1, the rear part of which is adapted to be secured to a chain saw 2 after the saw chain has been removed. The frame comprises a center member 3 and two side members 4 and 5 which form three forwardly directed parallel branches. In bearings 6 applied to the branches there is inserted a shaft 7 on which the cutter of the attachment is secured, which is designated by numeral 8 and comprises two halves applied between the branches, and on which is attached a sprocket wheel 9 positioned adjacent to the center member 3 and connected to a similar sprocket wheel 10 by means of a chain 11, so that the cutter is rotated with high speed by the driving mechanism of the chain saw.

The cutter 8 comprises a number of straight blades 12, which extend axially and are so placed that the blades of the two halves describe during rotation two frustums which diverge outwardly towards the ends of the cutter. As shown in FIG. 3 the blades are preferably set at an oblique angle in relation to planes extending longitudinally through the axis of the cutter and have sharpened edges directed forwardly in the direction of rotation. The blades are secured at their inner ends 13 to the corners of disks 14, which are applied perpendicular to the shaft 7 and have polygon shape, the number of sides in the polygon being equal to the number of blades. The outer ends 15 of the blades are rigidly attached to supports 16, which also are perpendicular and attached to the shaft 8 but are circular and have a radius which is substantially equal to but preferably somewhat exceeds the largest radius of cut or the contour, which the edges of the ends 15 of the blades describe during their rotation.

The frame 1 is further provided with two brackets 18, which project upwardly from the side members 4 and 5 and rotatably carry a roller 19 and a handle 20 by which the attachment is intended to be carried along. A cable 21 engages the roller 19 and runs over two other rollers 22 and 23 mounted in spaced relation along the inside of the side members 5. The ends of the cable are attached to a mounting 24 which is slidable in a slot 25 in the side member and carries a guide 26, which consists of a forwardly and upwardly inclined shaft 27 and a tube rotatably mounted thereon. In turning the handle 20 the guide 26 will be moved towards or away from the cutter 8. The end positions of the guide are determined by the length of the slot 25 and are chosen with respect to existing variations in diameters of the logs. By means of the guide the workman can hold the attachment irrespective of the size of the log 28 in such a position that the cutter will be symmetrically located relative to the log, as illustrated in FIGS. 1 and 2, which is desirable in order that the two halves of the cutter may work uniformly.

Figure 7:
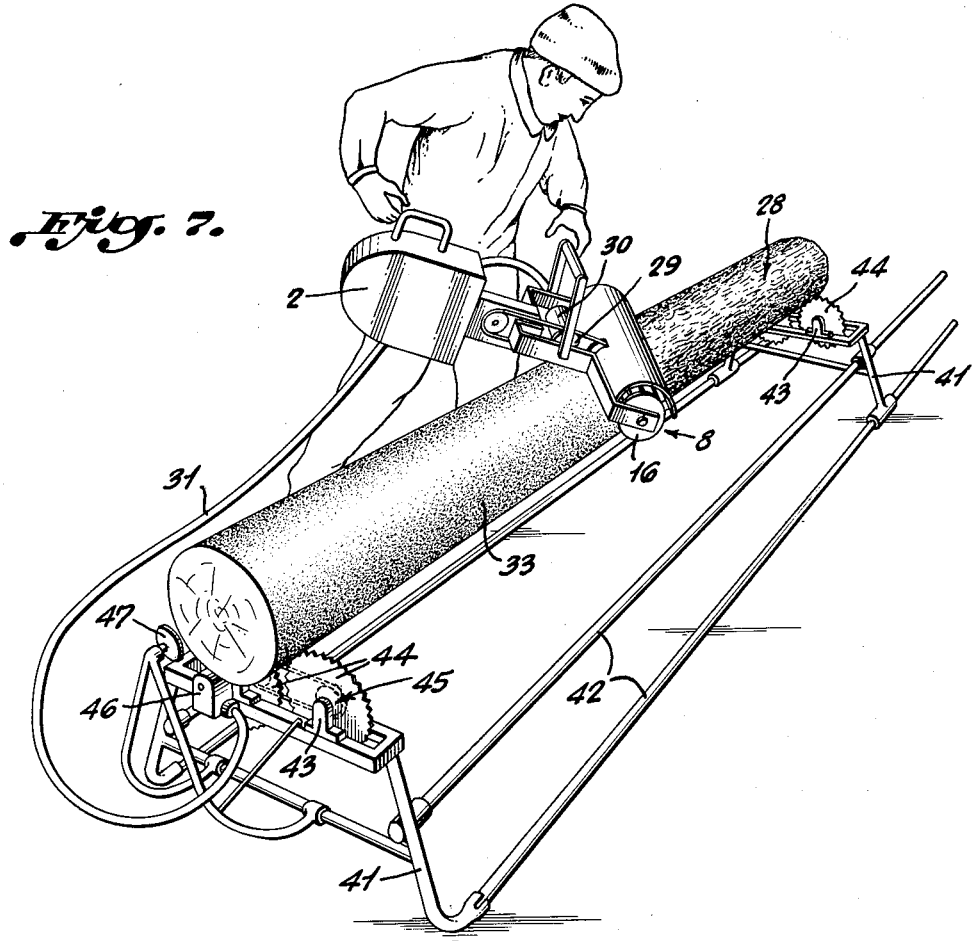
FIG. 7 is a perspective view of the attachment and a device cooperating therewith for rotating the workpiece.

To improve the efficiency of the bark-removing attachment during operation it is connected to a device for rotating the log as diagrammatically shown in FIG. 7. The device comprises two trestles 41 and a number of tubes 42 which are adapted to be inserted into guides in one trestle and through guides in the other trestle to form a saw-buck-like frame, the length of which can be adapted to the length of the logs. Each trestle carries a pair of bearing brackets 43, in which two sprocket wheels of the same size are journalled. One pair of the wheels are drivingly connected to each other by a conventional chain transmission 45 in such a way that the two wheels will rotate with the same speed and in the same direction.

To rotate a workpiece 28 placed on the sprocket wheels with a suitable peripherical speed, the sprocket wheels 44 are drivingly connected to a chain wheel 29, inserted between the wheels 9 and 10, via a coupling 30 of the type shown on page 941 of "Mechanical Engineers Handbook," 1941, and a flexible shaft 31 which is enclosed in a suitable protective cover. The shaft 31 has such a length that it permits displacement of the attachment along the whole length of the workpiece. The connection between the sprocket wheels and the shaft comprises a worm gear transmission generally indicated at 46, the output shaft of which drives the chain transmission 45. To prevent the log from axial movement the frame structure is provided with a stop 47.

The chain wheel 29 is arranged to be disconnected from the shaft 31 and for this the attachment is provided with a reelase button 32 easily accessible from the handle 20 or from the ordinary handle of the chain saw and arranged to act upon the coupling 30 via a link mechanism, not shown, so that the rotation of the log ceases when the button is pushed down, while the coupling is automatically set in operation by releasing the button 32 and the rotation of the log is again started.

In operation as shown in FIG. 7 the workman seizes the handle 20 by his left hand while he holds the chain saw through its normal handle by his other hand, so that the guide 26 engages the log. The position of the handle 20 is so chosen that the saw and the attachment balance each other. The cutter 8 is now moved over the log 28 from the right end, seen from the workman, and as the cutter 8 is moved to the left the surface of the log is engaged by the blades 12, so that the log along the length over which the cutter is moved will show an uninterrupted surface 33 from which the bar is entirely removed.

In chosing the directions of rotation of the wheels 44 and the cutter 8 as indicated by arrows on the drawing, the reaction force, which the blades of the cutter and the supports 16 exert on the workpiece and which is directed rearwardly at an oblique angle to the log, will effectively contribute to the displacement of the attachment along the log. This force also tends to rotate the log so that the power, which over the chain wheel 29, the flexible shaft 31 and the chain transmission 45 is transmitted to the log can be kept low. For smaller logs the reaction force from the cutter may be sufficient to rotate the log. In such a case however the worm gear 46 in connection with the flexible shaft is capable of controlling the rotation of the log so that the peripheral speed of the log will not be too large.

By means of the release button 32 the workman is enabled to stop the rotation of the log temporarily to enable him to clean the surface of the log completely where there are twigs, creases or other local irregularities.

By means of the supports 16 the workman can accurately select the depth of cut during the work, so that the bark 34 but not the wood 35 inside the bark will be removed. This is obtained by swinging the attachment so that the axis of rotation of the cutter as shown in FIG. 2 forms such an acute angle ($\alpha$) to the log that the supports will engage the arcuate side surface of the log when the depth of cut is the proper one. A smaller angular setting has to be used for logs having a small diameter and a larger angular setting has to be used for thicker logs.

As shown in FIG. 1 the depth of cut decreases towards the ends of the cutter partly because the supports prevent a cutting action from the outer ends 15 of the blades partly because the surface of the log underlaying the blades is curved even if the angle ($\alpha$) is small while the blades have a straight contour. The inner ends 13 of the blades will however provide a complete cutting ac- on account of the shape of the disks 14. For this reason the disks can evidently be circular in shape with a largest diameter which is somewhat smaller than the diameter of the circle which the corners 13 of the inner ends describe.

Figure 5:
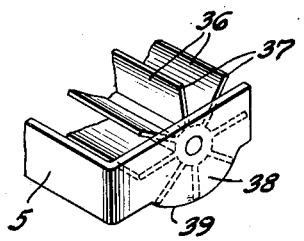
FIGS. 5 and 6 are two alternative embodiments of the invention.

The embodiment according to FIG. 5 differs from that above described in that the cutter has blades 36 the ends 37 of which are free. The side members 4 and 5 of the attachment are instead formed to provide supports 38 the slide surface 39 of which, facing the workpiece, can have a circular periphery in accordance with what is stated above, but which slide surface also can have a somewhat larger radius of curvature than the radius of cut formed by the ends of the blades without changing the favorable effect.

Figure 6:
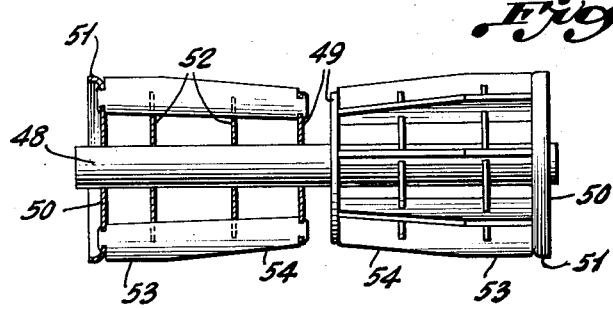

Another suitable embodiment of the cutter is illustrated in FIG. 6, wherein the half of the cutter is shown in section. The blades are here fixed relative to a shaft 48 by means of disks 49 at the center of the cutter and by means of end walls 50, the edges of which are turned outwardly so that softly rounded slide surfaces 51 arise. To support the blades there are also applied reinforcements 52 between the disks and the end walls.

The shape of the blades is such that the outer parts 53 of the cutter together with the slide surfaces 51 describe substantially cylindrical surfaces of rotation, while the inner parts 54 slope towards the axis of rotation by which a higher working capacity is obtained than that obtained by straight blades and end walls which axially shield the same. Since the greatest barking work is carried out by the half of the cutter which faces the non-barked log part, i.e. the upper half in FIG. 2 while the inner end outer parts 54 and 53 respectively of the other half serves to complete the removal of the bark and to peel the inner tissues these parts 53 are provided according to the invention with rounded edges or edges having a blunt edge angle.

We claim:

1. A log barking machine adapted to remove bark from logs in manually moving a rotating cutting tool in crosswise engagement with the log, comprising a ground-supported elongated frame, a pair of wheels rotatably mounted at each end of said ground-supported frame and adapted to rotatably support a log placed on the wheels, a portable frame, an elongated shaft rotatably mounted in said portable frame, a motor carried by said portable frame, transmission means operatively connecting said motor with said shaft, elongated cutting blades carried by said shaft means and extending outwardly and lengthwise with respect to the axis of rotation of said shaft, a cutting edge extending along each of the cutting blades to effect a cut, the radius of which decreases from the ends of the cutting tool towards the center thereof, an end part at each end of the cutting tool connecting the ends of the blades and axially shielding the blades to prevent the cutting edges at the ends of the blades from damaging the wood inside the bark, a circular slide surface formed on each end part concentric with the axis of the shaft means, said slide surfaces adapted to engage the arcuate surface of the log, and dependent on the angle at which the axis of rotation of the tool crosses the log, to determine the perpendicular setting of the cutting tool during operation, a gear transmission operatively connected to one of said pairs of wheels on said ground-supported frame, a flexible connection connecting said transmission means with said gear transmission so that said one pair of wheels is rotated in response to the rotation of the cutting tool.

2. A log barking machine according to claim 1, which includes a guide on the lower side of said portable frame, said guide projecting downwardly in eccentric relationship to said axis of rotation of the cutting tool and adapted to be brought into lateral engagement with the log to locate the slide surfaces in symmetric relationship to center planes extending longitudinally through the log.

3. A log barking machine according to claim 1, wherein the blades of the cutting tool are divided along their lengths in two halves, the inner ends of which are connected with each other by discs and the cutting tool halves formed thereby being spaced at the middle of the shaft, and a transmission wheel in said transmission means attached to said shaft between said tool halves.

4. A log barking machine according to claim 1, which further includes a releasable coupling in the connection between the cutting tool and said flexible connection shaft for disconnecting said one pair of wheels.

5. A log barking machine according to claim 2, wherein the rotation of said cutting tool causes a reaction force on the log to assist in the rotation of the same and displace the portable frame with motor and cutting tool along with the log, and the guide being in engagement with the log during movement of the portable frame therealong.

6. A log barking apparatus adapted to remove bark from logs in manually moving a power-driven rotating cutting tool in crosswise engagement with the log, comprising a ground-engaging sledlike frame, a pair of wheels rotatably mounted at each end of said sledlike frame and adapted to rotatably support a log placed on the wheels, a portable frame, shaft means rotatably mounted in said portable frame, a motor carried by said portable frame, transmission means operatively connecting said motor with said shaft means, a rotary cutting tool connected to said shaft means and having a radius of cut which decreases from the opposite ends of the cutting tool towards its center, support means extending crosswise of the shaft means at each end of the cutting tool and having a peripheral arcuate slide surface, the radius of which is substantially the same as the largest radius of cut of the cutting tool, to support the portable frame on the log during the operation of the same and to determine the depth of cut of the cutting tool, a gear transmission operatively connected to one of said pairs of wheels, and a flexible connection connecting said transmission means with said gear transmission so that said one pair of wheels is rotated in response to the rotation of the cutting tool.

7. Log barking apparatus according to claim 6, including a releasable coupling between said transmission means and said gear transmission for disconnecting said one pair of wheels.

8. An engine driven rotatable cutting tool for portable log barking apparatus of the kind which is adapted to be bodily moved in operation by a workman and adapted to remove bark from a log when holding the rotating cutting tool in crosswise engagement with the log, said cutting tool comprising a frame, shaft means journalled in the frame of the apparatus, elongated cutting blades carried by said shaft means and extending outwardly and lengthwise with respect to the axis of rotation of said shaft means, a cutting edge extending along each of the cutting blades to effect a cut, the radius of which increases from the center of the cutting tool towards the ends thereof, said blades having at the ends of the tool blunt blade edges which extend substantially parallel to the axis of rotation of the tool, an end part at each end of the cutting tool connecting the ends of the blades and axially shielding the blades to prevent the cutting edges at the ends of the blades from damaging the wood inside the bark, a circular slide surface formed on each end part concentric with the axis of the shaft means, said slide surfaces adapted to engage the arcuate surface of the log, and dependent on the angle at which the axis of rotation of the tool crosses the log, to determine the perpendicular setting of the cutting tool during operation, and said blunt blade edges adapted to remove inner remaining parts of the bark and smooth the barked surface.

References Cited in the file of this patent

UNITED STATES PATENTS

| | | |
|---|---|---|
| 2,681,670 | Prentice | June 22, 1954 |
| 2,918,952 | Searle | Dec. 29, 1959 |

FOREIGN PATENTS

| | | |
|---|---|---|
| 117,415 | Sweden | Oct. 15, 1946 |
| 129,964 | Sweden | Oct. 31, 1950 |
| 1,125,189 | France | July 9, 1956 |
| 1,220,168 | France | Jan. 4, 1960 |
| 87,829 | Norway | Aug. 6, 1956 |